United States Patent [19]

Hallmann et al.

[11] 4,300,890
[45] Nov. 17, 1981

[54] AUTOMATIC TENSION CONTROL MECHANISM FOR A DRIVE BELT

[75] Inventors: Melvin H. Hallmann, Middletown; Burr E. Stephens, Anderson, both of Ind.

[73] Assignee: General Motors Corporation, Detroit, Mich.

[21] Appl. No.: 135,655

[22] Filed: Mar. 31, 1980

[51] Int. Cl.³ ............................................. F16H 7/12
[52] U.S. Cl. ..................................... 474/110; 474/138
[58] Field of Search ............... 474/110, 109, 114, 115, 474/117, 138

[56] References Cited

U.S. PATENT DOCUMENTS 3,924,483 12/1975 Walker et al. ......................... 474/86
4,249,425 2/1981 Watson ................................. 474/110

FOREIGN PATENT DOCUMENTS 1725015 2/1976 Fed. Rep. of Germany ..... 74/242.1 FP

Primary Examiner—C. J. Husar
Assistant Examiner—Conrad Berman
Attorney, Agent, or Firm—Donald F. Scherer

[57] ABSTRACT

A belt tension controlling mechanism has a spring member which operates on a pulley support bracket to establish a tension in a belt trained on the pulley. The spring member surrounds a threaded sleeve which is rotated by a pair of selectively operable one-way ratcheting clutches which are simultaneously driven in opposite directions by a vacuum motor. The rotation of the sleeve results in linear meovement of a shaft connected to the pulley support bracket to thereby increase or decrease the belt tension, depending upon which clutch is operable.

4 Claims, 3 Drawing Figures

AUTOMATIC TENSION CONTROL MECHANISM FOR A DRIVE BELT

This invention relates to belt tension controlling mechanisms and more particularly to such mechanisms which are automatically operable to control the belt tension.

Automotive vehicles utilize a belt drive to transfer power from a power source, such as an internal combustion engine, to the accessory power mechanisms. Such accessory power mechanisms include air conditioning compressors, power steering pumps and electrical generating equipment. Generally, one or more of these accessory mechanisms is mounted on a bracket which may be pivoted about a fastener on the engine block. The tension of the belt which transmits the power from the engine to the accessory mechanisms is controlled by manually pivoting the bracket until the desired tension is obtained and then tightening the bracket in place. This provides a satisfactory belt tension for most operating conditions. However, it is possible to operate in extreme temperature conditions which will permit the belt to expand or contract sufficiently such that a significant change in belt tension occurs. If the belt should contract a significant amount, such as during extreme cold weather, the belt tension would be increased. This increase would result in higher stresses being applied to the bearings which support the drive pulleys which are in contact with the drive belt. If the belt should expand, the belt tension would be reduced such that full power might not be transmitted to the accessory unit.

Various belt tensioning devices have been suggested for controlling the tension within a drive belt. The simplest of these devices is to apply a spring load to one of the accessory mounting brackets such that automatic pivoting of the bracket will occur. Other devices, such as the one shown in U.S. Pat. No. 4,249,425, and assigned to the assignee of this application, provide for tightening of the belt but do not accommodate loosening of the belt. While loosening of the belt may not be necessary, it is desirable. If the belt tension is high, due to contraction of the belt during cold weather, this condition would normally change as the engine compartment temperature is increased during operation. However, it would be more desirable to adjust the belt tension to accommodate contraction of the drive belt, and then readjust the tension as the belt lengthens due to temperature increase. The present invention provides for both tightening and loosening of the belt as required.

It is an object of this invention to provide an improved belt tension controller which will positively adjust the belt tension when either an increase or a decrease in the belt tension is required.

It is another object of this invention to provide an improved belt tension controller wherein a pair of one-way ratcheting clutches are selectively engaged by the force differential between belt tension and a spring force and which clutches are simultaneously driven in opposite directions by a vacuum motor such that the clutch which is engaged, will operate on a screw actuator to adjust the belt tension in a direction which will decrease the force differential to zero.

These and other objects and advantages of the present invention will be more apparent from the following specification and drawings in which.

Figure 1:
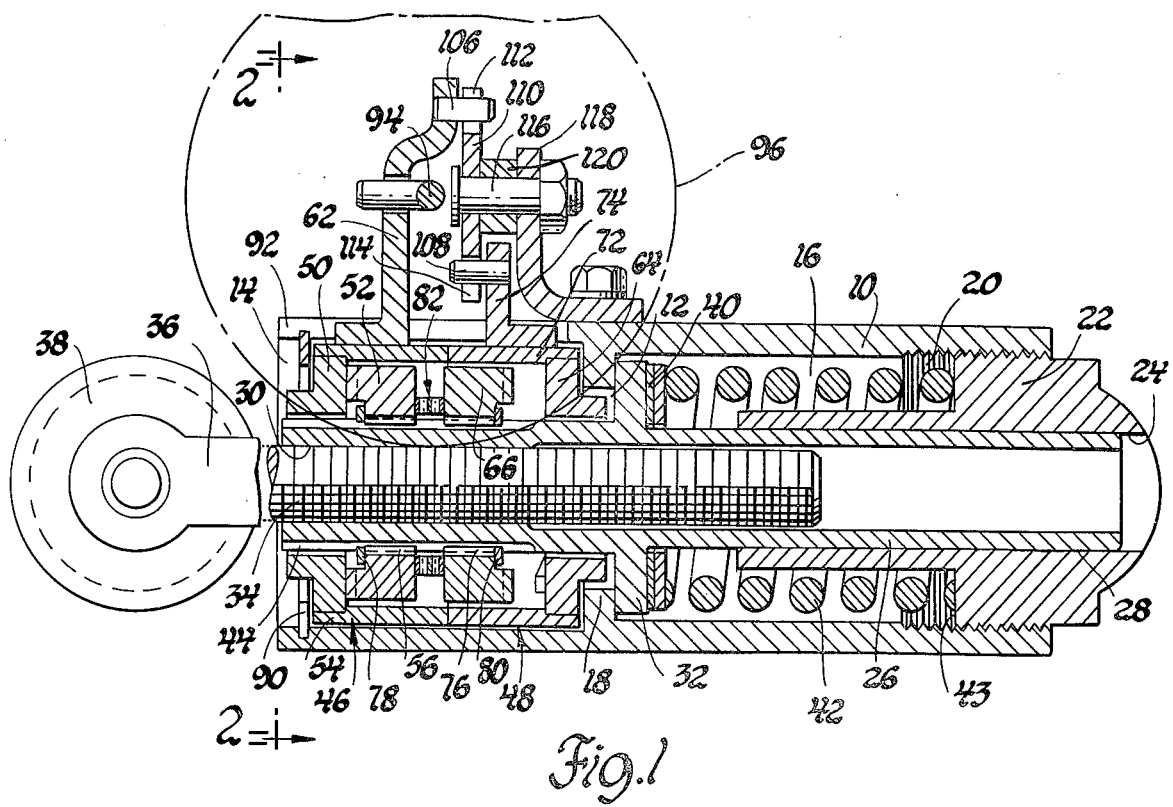
FIG. 1 is a sectional view taken along line 1—1 of FIG. 2.

Referring to the drawings, wherein like characters represent the same or corresponding parts throughout the several views, there is seen a housing 10, which is generally cylindrical and has a central opening 12, which is divided into a clutch housing portion 14 and a spring housing portion 16. The housing portion 14 and 16 are separated by an annular shoulder or wall 18. The spring housing portion 16 has a threaded portion 20 which is engaged by a threaded cap member 22.

The threaded cap member 22 has a central bearing opening 24 in which a threaded sleeve member 26 is slidably and rotatably mounted. The sleeve member 26 has an outer bearing portion 28 which cooperates with the opening 24. The threaded sleeve 26 also includes a centrally threaded portion 30 and a shoulder member 32. The central portion of the sleeve member 26 which is not threaded, has a larger diameter than the threaded portion to accommodate the linear travel of a threaded shaft 34 which is engaged in the threaded portion 30. The threaded shaft 34 has secured thereto a support bracket 36 on which is rotatably supported a pulley 38. In the alternative to the pulley 38 being supported on the bracket 36, the bracket 36 may be pivotally connected to an engine accessory mounting bracket such as the brackets conventionally used to mount an engine driven alternator or power steering pump mechanism. Using the structure shown, that is, the pulley 38 rotatably mounted on the bracket 36, requires that the belt would be trained around the pulley 38 such that this mechanism would provide an idler pulley adjustment for belt tension. If the alternative structure is used, the idler pulley is eliminated from the system and the belt tensioning force is applied to an accessory mounting bracket. The end result is the same since both permit the desired belt tension control to be achieved.

A thrust washer assembly 40 is disposed adjacent one surface of the shoulder 32 and is held in contact with this surface by a coil spring 42 which is compressed between an annular surface 43 on the threaded cap 22 and the thrust bearing 40. As seen in FIG. 1, the coil spring 42 urges the shoulder 32 toward abutment with the annular shoulder 18.

Figure 3:
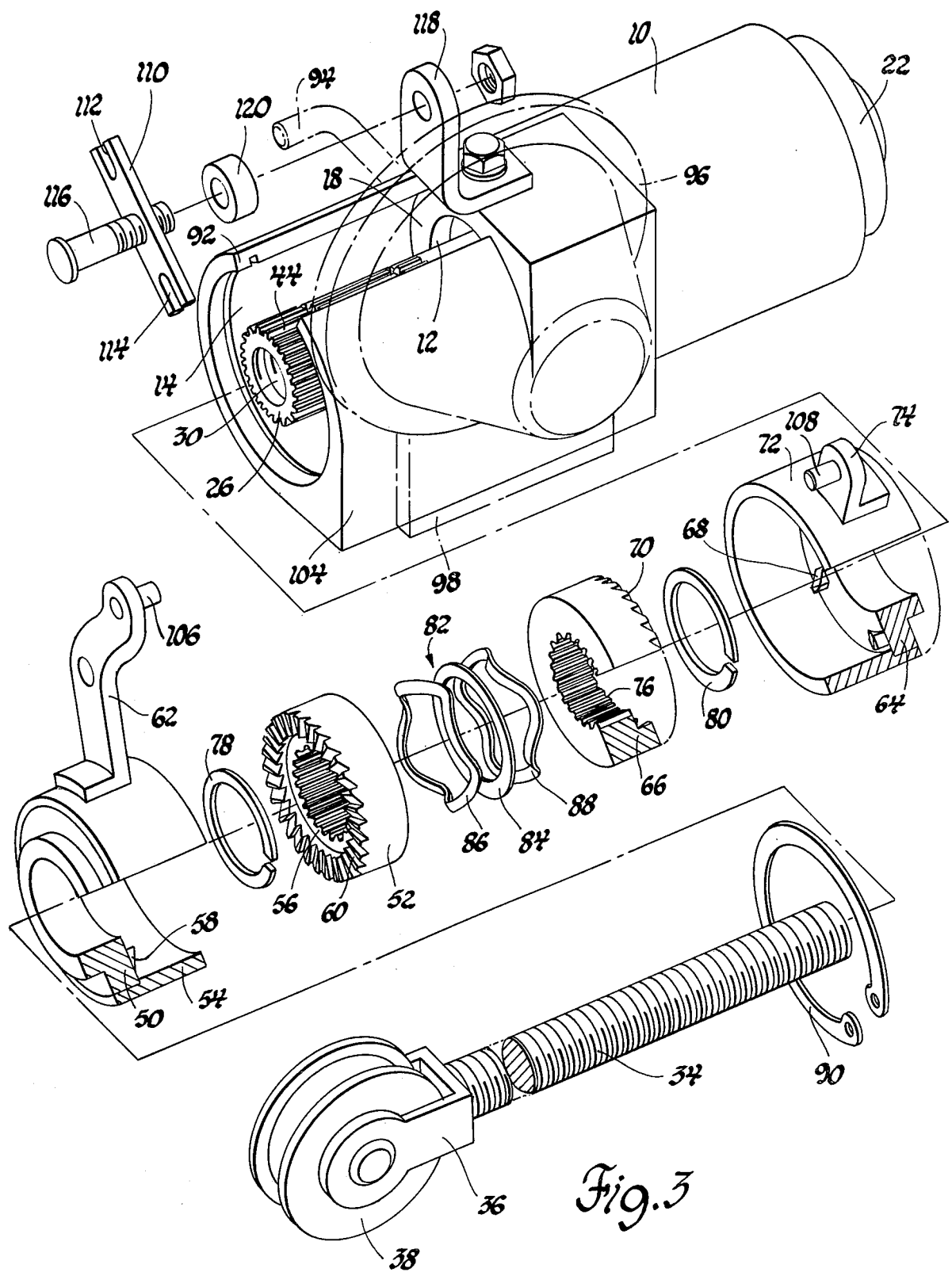
FIG. 3 is an exploded perspective view of a belt tensioning mechanism.

The sleeve member 26 has a spline 44 formed on the left end thereof, as viewed in FIGS. 1 and 3. The spline extends through a major portion of the clutch housing portion 14. A tightening clutch 46 and a loosening clutch 48 are operatively connected with the sleeve member 26 through the spline 44. The tightening clutch 46 has an input member 50 and an output member 52. The input member 50 is rotatably disposed on the spline 44 and has secured to the outer diameter, a rotatable housing 54. The output member 52 has a splined inner diameter 56 drivingly connected with the spline 44. The input and output members 50 and 52 have conventional clutch surfaces 58 and 60, respectively, which cooperate in engagement to provide a positive drive in one direction and a ratcheting one-way drive between the input and output members 50 and 52 in the other direction. The rotatable housing 54 has secured thereto, a drive link 62.

The loosening clutch 48 has an input member 64 and an output member 66. These members 64 and 66 have cooperating conventional clutch surfaces 68 and 70 which provide a positive drive and a one-way ratcheting clutch drive when in engagement. The input member 64 has secured thereto a rotatable housing 72 which has secured thereto a drive link 74. The input member 64 is rotatably disposed on the outer surface of the sleeve member 26 while the output member 66 has a splined inner diameter 76 which is drivingly connected to the spline 44. The output members 52 and 66 are limited in their travel along spline 44 by lock rings 78 and 80, respectively. The output members 52 and 66 are urged toward abutment with their respective lock rings 78 and 80 by a thrust and spring washer assembly 82 which is comprised of a thrust washer 84 and a pair of spring washers 86 and 88. The clutch assemblies 46 and 48 are limited in their leftward movement within the clutch housing portion 14 by a locking ring 90, which is secured in the inner surface of housing 10. The rightward movement of the clutch assemblies 46 and 48 is limited by the annular shoulder 18.

The drive links 62 and 74 extend radially outward through an arcuate opening 92 formed in the housing 10. The drive link 62 is connected to a drive rod 94 which is a component in a conventional vacuum-operated motor 96. The vacuum motor 96 is mounted to a bracket 98 by a pair of fasteners 100 and 102. The bracket 98 is secured to a mounting pad 104 formed integrally with the outer surface of housing 10. The drive link 62 has secured thereto a pin 106. A similar pin 108 is secured to the drive link 74. A reversing link 110 has a pair of slots 112 and 114 which drivingly engage the pins 106 and 108, respectively. The reversing link 110 is pivotally mounted on a fastener 116 which is secured to a bracket 118. The reversing link 110 is spaced from the bracket 118 by a spacer member 120.

Figure 2:
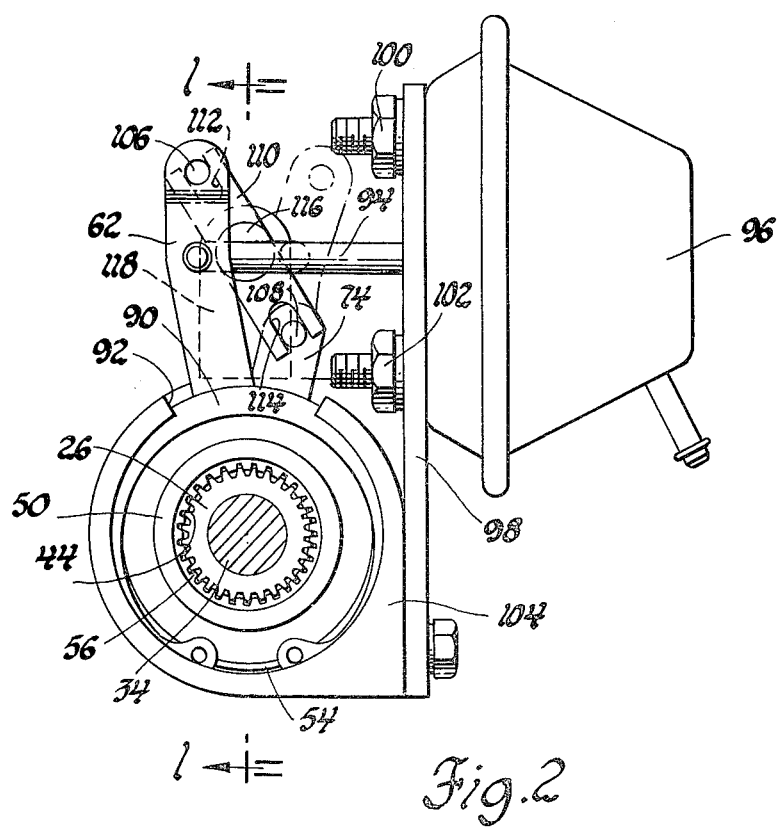
FIG. 2 is an end view, partly in section, taken along line 2—2 of FIG. 1.

As seen in FIG. 2, if the drive rod 94 is stroked to the right by the vaccum motor 96, the drive link 62 will pivot clockwise about the threaded sleeve 26 and due to the reversing action of reversing link 110, the drive link 74 will pivot counterclockwise. If the clutch 46 is engaged, as seen in FIG. 1, the clockwise rotation of link 62 will cause clockwise rotation of the threaded sleeve member 26 resulting in linear movement of the threaded shaft 34 to the left, as viewed in FIG. 1. This linear movement of shaft 34 will result in tightening of the belt which is adapted to be trained about pulley 38. It also results in an increase of the load imposed on spring 42. When the load on spring 42 is greater than the spring can accept, the sleeve member 26 will move to the right resulting in disengagement between members 50 and 52 of clutch 46. At this point, there is no longer a drive connection formed in either clutch 48 and 46 and the belt tension will not change. Should the belt tension increase, for example, if the belt gets cold and reduces in length, the increased tension will result in further compression of spring 42 such that input member 64 and output member 66 will be brought into engagement. At this time, pivoting of link 74 will result in the counterclockwise rotation of sleeve 26 to cause the threaded shaft 34 to move to the right as viewed in FIG. 1, thereby reducing the tension in the belt. The rotation of sleeve 26 will continue until the sleeve 26 moves to disengage both clutches 46 and 48 and the desired tension in the belt is achieved.

As previously mentioned, both clutches are of the ratcheting type such that they only transmit drive in one direction. Thus, when the drive rod 94 is being extended to the left, as viewed in FIG. 2, the clutches 46 and 48 will ratchet and no drive will be transmitted by either clutch. Thus, the clutches transmit torque only during the one stroke of the motor and are reset for another force transmission during the return stroke of the motor. The motor will stroke as long as vacuum variations are present. As is well-known with internal combustion engines, the inlet manifold vacuum changes quite often.

From the above, it is obvious that the tension in the belt will be primarily controlled by the force in spring 42. If the belt tension increases to overcome the force in spring 42, clutch 48 will automatically be engaged and reduce the belt tension. If the spring force is greater than the belt tension, the clutch 46 will be engaged to linearly move the threaded shaft 34 so that belt tension will be increased to a point where the force differential between belt tension and spring load is zero.

The spring tension can be controlled by the positioning of cap 22 in the housing 10. If more spring tension is desired, the cap 22 is threaded further into housing 10. Thus, various belt tensions can be accommodated by this device. It is also possible to simply replace the spring if substantially higher or lower belt tensions are required.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A belt tension controller for controlling the tension in a belt between maximum and minimum limits; said belt tension controller comprising: pulley support means for rotatably supporting a pulley adapted to direct and support a belt and being subjected to a force level proportional to the tension force in the belt; actuator means having an output member for moving said pulley support means to change the belt tension, and an input member; spring means for applying a force to and urging the input member in one direction, said input member being urged in the opposite direction by the tension force of the belt on said output member; and drive means operatively connected to said input member including unidirectional drive motor means, first and second clutch means, and linkage means for connecting said first and second clutch means to said drive motor means, said drive means being operable in response to said spring means being the higher force on the input member to connect said first clutch means to the input member to selectively move the output member in a direction to increase the belt tension force level and balance the forces on the input member and being operable in response to the belt tension being the higher force on the input member to connect said second clutch means to the input member to selectively move the output member in a direction to reduce the belt tension force level and balance the forces on the input member.

2. A belt tension controller for controlling the tension in a belt between maximum and minimum limits; said belt tension controller comprising: pulley support means for supporting a pulley adapted to direct and support a belt and being subjected to a force level proportional to the tension force in the belt; actuator means having an output member for moving said pulley support means to change the belt tension, and an input member; force determining and limiting means for applying a force to and urging the input member in one direction, said input member being urged in the opposite direction by the tension force of the belt on said output member; and drive means operatively connected to said input member and being operable in response to the higher force on the input member to selectively operate the input member to move the output member in a direction to change the belt tension force level to balance the forces on the input member.

3. A belt tension controller for controlling the tension in a belt between maximum and minimum limits; said belt tension controller comprising: pulley support means for supporting a pulley adapted to direct and support a belt and being subjected to a force level proportional to the tension force in the belt; actuator means having an output member for moving said pulley support means to change the belt tension, and an input member; force determining and limiting means for applying a force to and urging the input member in one direction, said input member being urged in the opposite direction by the tension force of the belt on said output member; and drive means operatively connected to said input member and being operable in response to a differential force between the belt tension and force determining and limiting means imposed on the input member to selectively operate the input member to move the output member in a direction to reduce the differential force level to balance the forces on the input member.

4. A belt tension controller for controlling the tension in a belt between maximum and minimum limits; said belt tension controller comprising: a pulley and support member adapted to direct and support a belt and being subjected to a force level proportional to the tension force in the belt; actuator means having an output member for moving said pulley and support member to change the belt tension, and an input member; force determining and limiting means for applying a force to and urging the input member in one direction, said input member being urged in the opposite direction by the tension force of the belt on said output member; and drive means operatively connected to said input member and including a pair of clutch means and which are operable in response to the higher of the spring and belt tension force to selectively operate the input member to move the output member in a direction to adjust the belt tension force level to balance the forces on the input member.

* * * * *